(12) United States Patent
Feau

(10) Patent No.: US 9,229,447 B2
(45) Date of Patent: Jan. 5, 2016

(54) METHOD AND DEVICE FOR AUTOMATICALLY DETECTING ERRONEOUS AIR DATA ON AN AIRCRAFT

(75) Inventor: Julien Feau, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 202 days.

(21) Appl. No.: 13/423,729

(22) Filed: Mar. 19, 2012

(65) Prior Publication Data

US 2012/0253559 A1  Oct. 4, 2012

(30) Foreign Application Priority Data

Mar. 29, 2011 (FR) ...................................... 11 52606

(51) Int. Cl.
| | | |
|---|---|---|
| *G05B 23/02* | (2006.01) | |
| *G01P 5/14* | (2006.01) | |
| *G01P 5/16* | (2006.01) | |
| *G05D 1/00* | (2006.01) | |
| *G08B 21/00* | (2006.01) | |
| *B64C 13/00* | (2006.01) | |
| *G05D 1/08* | (2006.01) | |

(52) U.S. Cl.
CPC .................................. *G05B 23/0262* (2013.01)

(58) Field of Classification Search
CPC .......... G01P 5/14; G01P 5/16; G05B 23/0262
USPC .................... 701/3, 4, 14, 7–9; 244/75.1, 108; 340/945
See application file for complete search history.

(56) References Cited

U.S. PATENT DOCUMENTS

| | | | |
|---|---|---|---|
| 5,648,604 A | 7/1997 | Morbieu | |
| 2005/0043865 A1* | 2/2005 | Seve | G01P 5/16 701/7 |
| 2007/0130096 A1* | 6/2007 | Selvig | G01P 5/14 706/45 |
| 2011/0071710 A1* | 3/2011 | Puig | G01C 21/16 701/14 |

FOREIGN PATENT DOCUMENTS

FR  2725033  3/1996

OTHER PUBLICATIONS

French Patent Office, Preliminary Search Report for FR 1152606, Sep. 13, 2011 (2 pgs.).

* cited by examiner

*Primary Examiner* — Yonel Beaulieu
*Assistant Examiner* — Basil T Jos
(74) *Attorney, Agent, or Firm* — Wood, Herron & Evans, LLP

(57) ABSTRACT

A method for detecting erroneous air data on an aircraft includes determining a current air parameter and a current altitude pressure parameter which collectively define a current point of control for the aircraft. The method also includes verifying whether the current point of control is situated in a characteristic envelope indicating operating limits for the aircraft. When the current point of control is outside the characteristic envelope, then a detection piece of information identifying at least one of the parameters as an erroneous parameter is emitted, which causes that erroneous parameter to be invalidated and an alarm signal to be sent to the crew. Therefore, an erroneous air data parameter is readily addressed and discarded using the method and associated device.

10 Claims, 2 Drawing Sheets

METHOD AND DEVICE FOR AUTOMATICALLY DETECTING ERRONEOUS AIR DATA ON AN AIRCRAFT

TECHNICAL FIELD

The present invention relates to a method and a device for automatically detecting an erroneous air data on an aircraft, in particular a transport airplane, during a flight of the latter.

BACKGROUND

The present invention applies to air data (that is being relative to the air) intended for the control of the aircraft or the engines thereof, including the following data or parameters:
- primary parameters, being directly measured on the aircraft using usual means: Ps (static pressure), Pt (total pressure) and TAT (total temperature); as well as
- derived parameters, being usually calculated using primary parameters: Mn (Mach number), CAS (calculated air speed), Alt (altitude pressure).

Such air data are important for the control of the aircraft as well as for the control of the engines, the use of erroneous values by embedded systems being able to result in a control loss for the aircraft or the engines. For instance, too low an air speed, being not detected by a control system of the aircraft, could result in the latter engine stalling if it is used. As far as the control of an engine is concerned, using an erroneous temperature value could generate a thrust and/or pumping loss (switching off the engine could then be possible).

Numerous incidents were, in the past, either directly or indirectly, the result of using erroneous air data.

Thus, the current control systems of the aircraft and the engines in general comprise systems for selecting air data allowing to remove an erroneous data. Such systems are generally based on the processing of the results of a plurality of redundant measurement sources. Thus, if one of them supplies an erroneous data, being detected thanks to a comparison with the (correct) data from the other sources, such corresponding air data and source are invalidated, that is are no longer used in the remainder of the flight.

However, with this usual solution, a problem could occur when several sources are affected by a same cause (such as, for instance, frost).

Furthermore, current control systems of the aircraft and the engine also comprise frost detection specific logics based on abnormal speed or temperature variations. However, it is not sure that a frost case is not able to induce speed or temperature variations outside the thresholds provided by models. Furthermore, defect cases other than frost (error of the calculator transmitting the air data, corruption of the communication means between the systems, mechanical or electrical defect of the measurement probe), could also, theoretically, affect the validity of an air data.

The present invention aims at overcoming such drawbacks. It relates to a method allowing detection, in a particularly reliable and efficient way, of any erroneous air data on an aircraft during a flight of the latter, such a method allowing, more specifically, all the above mentioned cases to be included.

SUMMARY OF THE INVENTION

To this end, according to this invention, said method is remarkable in that, automatically and repeatedly:

a) a current air parameter is determined on the aircraft, that is a speed parameter or temperature parameter, as set forth below;

b) a current altitude pressure parameter is also determined on the aircraft;

c) it is checked whether a current point of control comprising a couple of parameters, namely said current air parameter (speed parameter or temperature parameter) and said current altitude pressure parameter, is situated in a characteristic envelope being relative to the aircraft and indicating operating air parameter and altitude pressure limits for the aircraft, such a characteristic envelope being able to be (according to the embodiment) a flight envelope or an environmental envelope, as set forth below; and d) when said current point of control is situated outside said characteristic envelope, a detection piece of information is emitted indicating that at least one of said parameters (current air parameter or current altitude pressure parameter) forming said current point of control is erroneous, said air data being able to correspond to one of said parameters or to a data allowing to determine one of these parameters. If at step d) a detection piece of information is emitted, indicating that a parameter is erroneous, preferably this parameter is invalidated, so that it is then no longer used at least as long as it remains erroneous, generally at least until the end of the on-going flight.

Thus, thanks to this invention, automatically a current air parameter is checked, that is a speed parameter or a temperature parameter, with respect to an altitude pressure parameter. When the two parameters do not determine a point inside a characteristic envelope (able to be, according to the embodiment, a flight envelope or an environmental envelope, as set forth below), at least one of the two parameters is considered as erroneous, as the aircraft could not be maintained in flight in such conditions.

Thus, it is possible to detect, in a reliable and efficient way, the generation of an erroneous air data. Such an air data could correspond to one of said above mentioned parameters (namely a derived parameter) or to a data (or primary parameter) allowing to determine one of these parameters. The present invention thus applies to air data intended for the control of the aircraft or its engines, including the following data or parameters:
- data (or primary parameters), being directly measured on the aircraft using usual means: Ps (static pressure), Pt (total pressure) and TAT (total temperature); as well as
- derived parameters, being usually calculated using primary parameters: Mn (Mach number), CAS (calculated air speed), Alt (altitude pressure).

The method according to the invention allows all the above mentioned cases to be covered including the case for which several sources of data are affected by a same problem such as frost, for instance.

According to a preferred embodiment:
- at a preliminary step, from said characteristic envelope, a limitation list is determined defining, for each one of a plurality of values of a first one of said parameters in said couple, minimum and maximum limit values for the second parameter in said couple; and
- at step c), for each current point of control, it is checked whether the second current parameter of said current point of control is situated between the minimum and maximum limit values of said limitation list, being associated with the first current parameter of said current point of control.

Generating and using such a limitation list make the implementation of the present invention easier.

In a first embodiment, said current air parameter and said current altitude pressure parameter are determined using information coming from one same source of information measuring on the aircraft data to be used for determining said parameters, and if at step d) a detection piece of information is emitted, it indicates that the two parameters are erroneous.

Moreover, in a second embodiment, first of all one of said two current parameters is validated, being considered as not erroneous, the other parameter being not validated, and if in step d) a detection piece of information is emitted, it indicates that the not validated parameter is erroneous.

In a first embodiment, said characteristic envelope is a usual flight envelope of the aircraft, said air parameter being a speed parameter of the aircraft (Mach number or a speed of the Calibrated Air Speed ("CAS"). Such a flight envelope being characteristic of the aircraft being considered thus indicates the limits in air speed and in altitude pressure, in which the aircraft could fly as a function of its own characteristics and abilities or performances. The aircraft is not devised for not being maintained in flight, beyond those limits.

Two flight envelopes are generally known for an aircraft, namely a nominal envelope defining the normal operational envelope and a peripheral envelope defining the extreme envelope of the aircraft. Within the context of the present invention, said extreme envelope of the aircraft is taken into consideration as the characteristic envelope to be used at step c) of the method.

This first embodiment thus provides checking an air speed parameter with respect to an altitude pressure parameter. When the two parameters do not determine a point inside the flight envelope, at least one of these two parameters should be considered as erroneous, as the aircraft could not be maintained in flight in such conditions.

In a second embodiment, said characteristic envelope is a usual environmental envelope, being defined for an air parameter representing a temperature (preferably a static temperature). This environmental envelope being characteristic of the aircraft being considered thus indicates the limits in temperature and in altitude pressure, in which the aircraft could fly as a function of its own characteristics and abilities.

In addition, in this second embodiment, if said air parameter corresponds to a total temperature, for the limitation list relative to said characteristic envelope, the minimum and maximum limit values of static temperature are preliminarily converted into minimum and maximum limit values of total temperature, to be used afterwards at step c). Such a conversion preferably uses a selected Mach number, as set forth below.

This second embodiment thus provides checking a temperature parameter with respect to an altitude pressure parameter, using an environmental envelope.

The present invention further relates to a device for detecting an erroneous air data on an aircraft, in particular a transport airplane, during a flight of the latter.

According to this invention, said device being embedded is remarkable in that it comprises a first control device for receiving a current air parameter of the aircraft;

a second control device for receiving a current altitude pressure parameter of the aircraft;

an envelope compliance checking device for checking that a current point of control comprising a couple of parameters, namely said current air parameter and said current altitude pressure parameter, is situated in a characteristic envelope being relative to the aircraft and indicating operating air parameter and altitude pressure parameter limits for the aircraft; and a warning device for emitting a detection piece of information indicating that at least one of said parameters forming said current point of control is erroneous, when said current point of control is situated outside said characteristic envelope.

Preferably, said device further comprises a device for invalidating a parameter being considered as erroneous, so that it is then no longer used by embedded systems, at least as long as it remains erroneous, generally at least until the end of the on-going flight.

Moreover, in a particular embodiment, said device further comprises measurement devices for determining on the aircraft said current air parameter, as well as measurement devices for determining on the aircraft said current altitude pressure parameter.

Furthermore, the present invention also relates to a control system for an aircraft, either a usual system controlling the flight of the aircraft, or a usual system controlling at least an engine of the aircraft, such a system being provided with a device such as specified above.

The present invention further relates to an aircraft, in particular a transport airplane, comprising a device and/or a system such as mentioned hereinabove.

BRIEF DESCRIPTION OF THE DRAWINGS

The FIGS. of the appended drawing will better explain how this invention can be implemented.

In these FIGS., like reference numerals relate to like components.

DETAILED DESCRIPTION

The erroneous air data detection device 1 according to the invention being embedded on a an aircraft (AC), in particular a transport airplane, is intended for automatically detecting an erroneous air data available on the aircraft, during a flight of the aircraft AC.

The present invention applies to air data, namely data relative to the air, being intended for the control of the flight of the aircraft or of least one of its engines, and including at least one of the following data or parameters:

primary parameters, being directly measured on the aircraft using devices: static pressure (Ps), total pressure (Pt) and total temperature (TAT); as well as derived parameters, being usually calculated using primary parameters: Mach number (Mn), corrected speed (CAS), altitude pressure (Alt).

Such air data are critical for the control of the aircraft as well as for the control of the engines, the use of erroneous values by embedded systems being able to result in a control loss of the aircraft or the engines.

Figure 1:
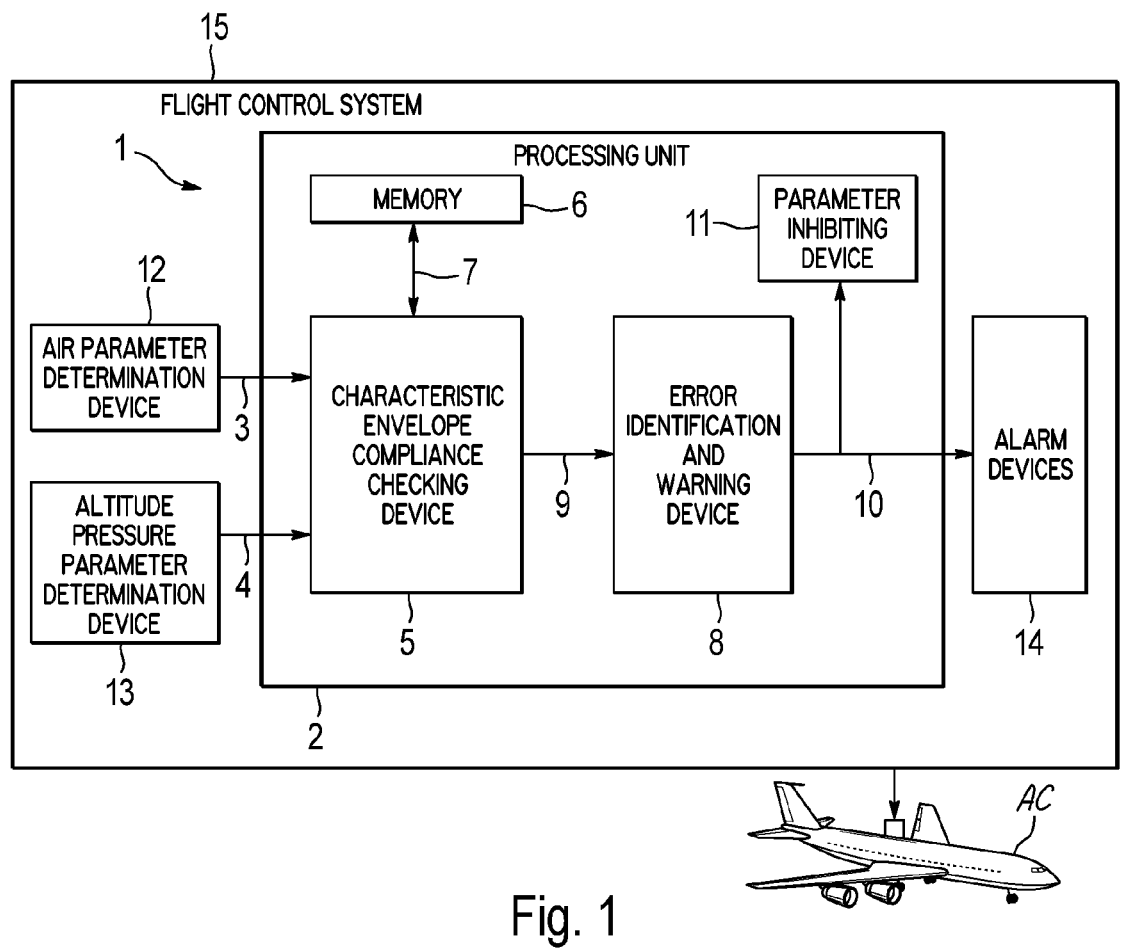
FIG. 1 is a block diagram of a device according to this invention.

The erroneous air data detection device 1 comprises, more specifically, a processing unit 2 represented on FIG. 1 implementing the automatic processes according to this invention allowing an erroneous speed to be detected.

To this end, this processing unit 2 comprises:

links 3 and 4, that automatically and repeatedly receive, respectively:

a current air parameter of the aircraft, namely a speed parameter or a temperature parameter, as set forth below; and a current altitude pressure parameter of the aircraft;

a characteristic envelope compliance checking device 5 being connected to said links 3 and 4 and being formed so as to automatically and repeatedly check if a current point of control comprising said couple of current parameters, namely said current air parameter and said current altitude pressure parameter, is situated in a characteristic envelope. This characteristic envelope is relative to the aircraft and indicates the acceptable pairs or couples of operating air parameter and the altitude pressure parameter limits, for the aircraft. This characteristic envelope (representing according to the embodiment a flight envelope or an environmental envelope, as set forth below) could be recorded in a memory 6, preferably in the form of a limitation list, as set forth hereinafter, and be transmitted to the characteristic envelope compliance checking device 5 via a link 7; and an error identification and warning device 8 being connected via a link 9 to the characteristic envelope compliance checking device 5 and being formed so as to emit (via a link 10) a detection piece of information indicating that at least one of said parameters forming the current point of control is erroneous, when said current point of control is situated outside said characteristic envelope.

Preferably, the processing unit 2 further comprises a parameter inhibiting device 11 for invalidating a parameter being considered as erroneous, so that it is then no longer used by embedded systems (and including by the system the processing unit 2 is integrated into), at least as long as it remains erroneous, generally at least until the end of the on-going flight.

Thus, the erroneous air data detection device 1 according to the invention is able to detect, in a reliable and efficient way, the generation of an erroneous air data. This air data could correspond to one of the above mentioned parameters, namely a derived parameter or a primary parameter.

The erroneous air data detection device 1 according to the invention allows for all the error cases to be covered likely to be encountered and including the case for which several sources of data are affected by a same problem such as frost, for instance. The origins of the errors (able to be detected) could be varied:

hence, a frost;

an error of the calculator transmitting the air data;

corruption of the communication devices between the embedded systems;

a mechanical or electrical defect of the measuring probe of the air data, etc.

The principle of the invention is thus based on using a flight envelope or an environmental envelope of the aircraft for checking whether an air data is erroneous or not.

In a preferred embodiment, at a preliminary step, from the characteristic envelope to be used, a limitation list is determined defining, for each one of a plurality of values of a first one of the parameters in the couple being considered, minimum and maximum limit values for the second parameter in said couple. This limitation list is recorded in the memory 6 containing the flight envelope of the aircraft. The characteristic envelope compliance checking device 5 then, repeatedly, check for each new current point of control (namely for each couple), if the second current parameter of said current point of control is indeed situated between the minimum and maximum limit values of said limitation list, being associated with the first current parameter of said current point of control.

Generating and using such a limitation list makes the implementation of the present invention easier.

In a particular embodiment, the erroneous air data detection device 1 further comprises:

an air parameter determination device 12 (being connected to the link 3) for usually determining (namely measuring and/or calculating) said current air parameter; and an altitude pressure parameter determination device 13 (being connected to the link 4) for usually determining (namely measuring and/or calculating) said current altitude pressure parameter.

The erroneous air data detection device 1 could further comprise alarm devices 14, for instance display devices and/or printing devices, for warning an operator, in particular an operator in charge of the maintenance or a pilot, when an erroneous air data is detected.

In a preferred embodiment and as shown in FIG. 1, the erroneous air data detection device 1 (or preferably the processing unit 2 of the erroneous air data detection device 1) is directly integrated into an embedded control system using air data, either a usual system (such as a flight control system) to control the flight of the aircraft, or a usual system controlling at least an engine of the aircraft. Such a system is advantageous in that it has available air parameters to be used in the processing of the present invention. It could however also be contemplated either that the erroneous air data detection device 1 is an independent device, or that it is associated with or integrated into a source of information measuring or determining an air data.

In a first embodiment, the air parameter determination device 12 and the altitude pressure parameter determination device 13 determine said current air parameter and said current altitude pressure parameter using information coming from one same source of information measuring on the aircraft data to be used for determining said parameters. In such a case, if a detection piece of information is emitted, the two parameters are considered as being erroneous.

Moreover, in a second embodiment, first of all one of said two current parameters is validated, being considered as not erroneous, the other parameter being not validated. In such a case, if a detection piece of information is emitted, it is considered that the not validated parameter is erroneous.

Figure 2:
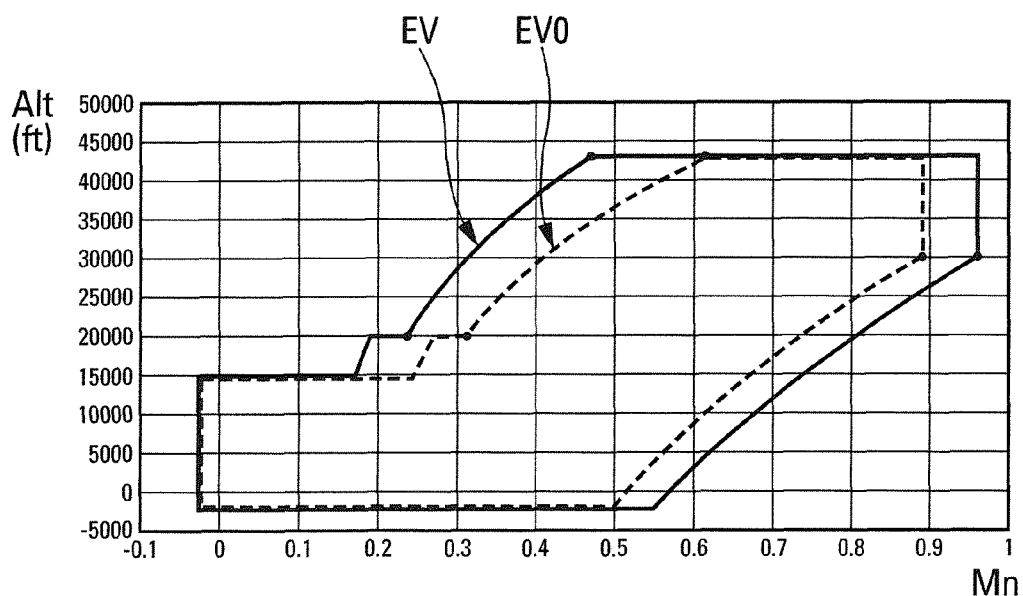
FIG. 2 is a diagram illustrating a flight envelope being used for implementing the present invention in one embodiment.

In a first embodiment, said characteristic envelope is a usual flight envelope EV of the aircraft, as illustrated on FIG. 2. In such a case, said air parameter is an air speed parameter of the aircraft (Mach number or a corrected speed of the Calibrated Air Speed ("CAS") type). Such a flight envelope being characteristic of the aircraft being considered thus indicates the limits in air speed and in altitude pressure, in which the aircraft could fly as a function of its own characteristics and abilities. The aircraft is not devised for being maintained in flight, beyond those limits.

Two flight envelopes EV and EV0 are generally known for an aircraft, namely a nominal envelope defining the normal operational envelope EV0 and a peripheral envelope defining the extreme envelope EV of the aircraft. These flight envelopes EV and EV0 are shown on the diagram of FIG. 2 respectively via a solid line plot and a dashed line plot, partially overlapping and therefore defining the limits in Mach number (Mn) and in altitude pressure (Alt) expressed in feet (ft), in which the aircraft could fly as a function of its own characteristics and abilities. Within the context of the present invention, said extreme envelope EV of the aircraft is taken into consideration as a characteristic envelope.

This first embodiment thus provides checking an air speed parameter with respect to an altitude pressure parameter. When the two parameters do not determine a point in the flight envelope EV, at least one of these two parameters should be considered as erroneous, as the aircraft could not be maintained in flight in such conditions.

The erroneous air data detection device 1 is thus able to individually check each one of the sources of air speed and of altitude pressure for ensuring that their combination is effectively in the flight envelope EV. In the opposite case, the erroneous air data detection device 1 could invalidate the altitude pressure data (as well as the static pressure data associated with this measurement) and/or the air speed data (as well as the total pressure data associated with this measurement and the Mach number).

There are several ways to check an air speed parameter and an altitude pressure parameter.

Speed and altitude data could, for instance, be selected coming from a same source. An aircraft generally comprises several sources (referred to as ADIRU1/2/3) for measuring air data. Each one of the sources is connected to different probes (pitot, static pressure probe, total temperature probe) and transmits its data to the systems of the aircraft. If the air speed parameter and the altitude pressure parameter from this same source do not determine a point in the flight envelope EV, then the erroneous air data detection device 1 invalidates both the speed data (as well as the total pressure data associated with this measurement and the Mach number) and the altitude data (as well as the static pressure data associated with this measurement) from this same source.

It could also be decided to check a speed data from a particular source with respect to a preliminarily validated altitude data, including based on comparisons between all the sources. And conversely, an altitude data could also be checked, from a particular source with respect to a preliminarily validated speed data, from comparisons between all the sources. The data having been itself preliminarily validated by the flight envelope and selected through comparison with the other sources, such a data could be considered as an appropriate reference for checking the data from each one of the sources. In this case, if an altitude/speed combination results in a control point outside the flight envelope EV, only the altitude or the speed data is invalidated, coming from a particular source. Such a solution allows the air data being effectively erroneous to be identified.

By way of illustration, a limitation list has been hereinafter given, obtained from a flight envelope EV relative to a Mach number (Mn) and to an altitude pressure (Alt), such as shown on FIG. 2. This limitation list defines, for a plurality of altitude pressure (Alt) values expressed in feet (ft), minimum and maximum limit values for the Mach number (Mn). This limitation list is shown in two parts below, relative respectively to the minimum limit values (minimum Mach number) and to the maximum limit values (maximum Mach number) of the Mach number (Mn).

| Altitude pressure (feet) | Minimum Mach number |
|---|---|
| −2000.0 | 0.548 |
| 0.0 | 0.567 |
| 1000.0 | 0.576 |
| 2000.0 | 0.586 |
| 3000.0 | 0.596 |
| 4000.0 | 0.607 |
| 5000.0 | 0.617 |
| 6000.0 | 0.628 |
| 7000.0 | 0.639 |

-continued

| Altitude pressure (feet) | Minimum Mach number |
|---|---|
| 8000.0 | 0.65 |
| 9000.0 | 0.661 |
| 10000.0 | 0.673 |
| 11000.0 | 0.685 |
| 12000.0 | 0.697 |
| 13000.0 | 0.709 |
| 14000.0 | 0.722 |
| 15000.0 | 0.735 |
| 16000.0 | 0.748 |
| 17000.0 | 0.761 |
| 18000.0 | 0.775 |
| 19000.0 | 0.789 |
| 20000.0 | 0.804 |
| 21000.0 | 0.819 |
| 22000.0 | 0.834 |
| 23000.0 | 0.849 |
| 24000.0 | 0.865 |
| 25000.0 | 0.881 |
| 29654.3 | 0.96 |
| 43100.0 | 0.96 |
| 44000.0 | 0.96 |

| Altitude pressure (feet) | Maximum Mach Number |
|---|---|
| −2000.0 | −0.025 |
| 14600.0 | −0.025 |
| 14800.0 | 0.169 |
| 15000.0 | 0.17 |
| 16000.0 | 0.173 |
| 17000.0 | 0.177 |
| 18000.0 | 0.18 |
| 19000.0 | 0.184 |
| 20000.0 | 0.189 |
| 20500.0 | 0.236 |
| 21000.0 | 0.241 |
| 22000.0 | 0.247 |
| 23000.0 | 0.253 |
| 24000.0 | 0.26 |
| 25000.0 | 0.267 |
| 26000.0 | 0.274 |
| 27000.0 | 0.284 |
| 28000.0 | 0.293 |
| 29000.0 | 0.304 |
| 30000.0 | 0.315 |
| 31000.0 | 0.326 |
| 32000.0 | 0.335 |
| 33000.0 | 0.343 |
| 34000.0 | 0.352 |
| 35000.0 | 0.362 |
| 36000.0 | 0.372 |
| 37000.0 | 0.384 |
| 38000.0 | 0.398 |
| 39000.0 | 0.413 |
| 40000.0 | 0.427 |
| 41000.0 | 0.439 |
| 42000.0 | 0.452 |
| 43100.0 | 0.466 |
| 44000.0 | 0.47 |

Thus, as an illustration, if the altitude pressure parameter determination device 13 provides a current altitude pressure value for instance of 17000 feet, the characteristic envelope compliance checking device 5 knows the corresponding minimum and maximum limit values for the Mach number, from the previous limitation list recorded in the memory 6, namely 0.177 and 0.761. The characteristic envelope compliance checking device 5 then checks that the current Mach number (associated with said current altitude pressure value of 17000 feet) actually ranges between 0.177 and 0.761, and it deduces from these comparisons that these current parameters are either erroneous or valid.

On the other hand, in a second embodiment, said characteristic envelope is a usual environmental envelope EE, being defined for an air parameter representing a temperature. This second embodiment thus provides checking a temperature parameter with respect to an altitude pressure parameter, using an environmental envelope EE.

Figure 3:
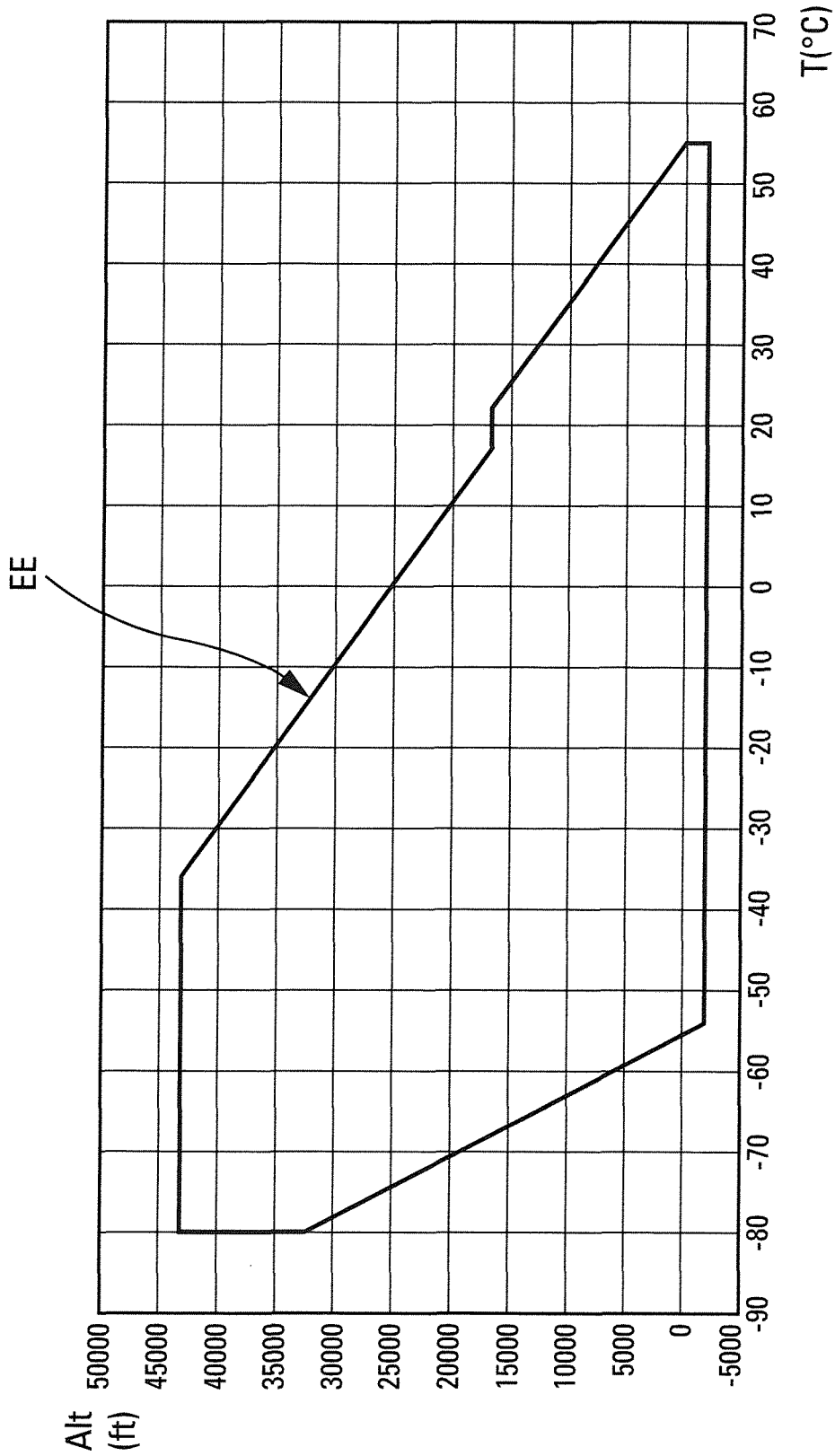
FIG. 3 is a diagram illustrating an environmental envelope being used for implementing the present invention in another embodiment.

Such an environmental envelope EE is shown on the diagram of FIG. 3 by means of a solid line plot defining the temperature (T) limits expressed in ° C. and the altitude pressure (Alt) limits expressed in feet (ft), in which the aircraft could fly as a function of its own characteristics and performances. The aircraft is not devised for being maintained in flight, beyond the limits defined by this flight envelope EE.

Moreover, in this second embodiment, if said checked air parameter corresponds to a total temperature TAT and if the environmental envelope is relative to a static temperature SAT, such as for the example of FIG. 3, the minimum and maximum limit values of the static temperature SAT (of the limitation list relative to said characteristic envelope) are converted into minimum and maximum limit values of the total temperature TAT so as to obtain an adapted limitation list to be subsequently used by the characteristic envelope compliance checking device 5. This conversion preferably takes into consideration a selected Mach number, used during the previous calculation cycle.

In a preferred embodiment, the limit values of static temperatures (SAT) are converted into limit values of total temperatures (TAT), using the Mach number (Mn) and the following equation:

$$TAT=SAT[1+0.2\ Mn^2].$$

This Mach number Mn preferably corresponds to the Mach number selected via comparison between all the sources and preliminarily validated by the flight envelope (so as to ensure it represents an appropriable reference data).

If a data of total temperature TAT from a particular source is detected outside the limit values determined by altitude pressure selected via comparison between all the sources (and preliminarily validated), then the erroneous air data detection device 1 invalidates the data of total temperature TAT from this particular source.

The present invention thus provides implementing, within systems of the aircraft, being sensitive to data of the air temperature (for instance a control system of the aircraft or a control system of an engine), a modeling of the environmental envelope EE, as well as the detection logics of an erroneous data of total temperature TAT, as indicated hereinabove.

The invention claimed is:

1. A method for detecting at least one erroneous air data with an erroneous air data detection device on an aircraft during a flight, the method comprising the following steps, performed automatically and repeatedly:
    (a) determining, by an air parameter determination device, a current air parameter on the aircraft;
    (b) determining, by an altitude pressure parameter determination device, a current altitude pressure parameter on the aircraft;
    (c) determining, by a processing unit, whether one of the current air parameter and the current altitude pressure parameter is erroneous, based solely on the following steps:
        (c1) comparing, by a characteristic envelope compliance checking device in the processing unit that communicates with and is distinct from each of the air parameter determination device and the altitude pressure parameter determination device, (i) a current point of control defined by a pairing of the current air parameter and the current altitude pressure parameter, to (ii) a characteristic envelope defined by minimum and maximum air parameter limits and also minimum and maximum altitude pressure parameter limits; and
        (c2) identifying, by an error identification and warning device in the processing unit, that at least one of the parameters defining the current point of control is an erroneous parameter based solely on whenever the current point of control is outside the characteristic envelope, as determined in step (c1); and
    (d) limiting an impact of the erroneous parameter on control of the aircraft by emitting, by the error identification and warning device, a detection piece of information that identifies the erroneous parameter, wherein step (d) also includes:
        (d1) invalidating, by a parameter inhibiting device, the erroneous parameter to prevent the erroneous parameter from being used by a flight control system of the aircraft; and
        (d2) warning, by alarm devices, a crew of the aircraft about the erroneous parameter.

2. The method according to claim 1, further comprising:
    determining from the characteristic envelope, by a memory communicating with the characteristic envelope compliance checking device, a limitation list defining, for each one of a plurality of values of a first parameter of the pairing of two parameters, minimum and maximum limit values for a second parameter of the pairing of two parameters; and
    checking, by the characteristic envelope compliance checking device at step (c1), for each current point of control that the second parameter of the current point of control is situated between the minimum and maximum limit values defined by the limitation list, being associated with the first parameter of the current point of control.

3. The method according to claim 1, wherein the air parameter determination device determines the current air parameter and the altitude pressure parameter determination device determines the current altitude pressure parameter using information coming from one single source of information measuring aircraft data to be used for determining the parameters, and wherein at step (d) when the detection piece of information is emitted, each of the two parameters defining the current point of control are identified as being erroneous.

4. The method according to claim 1, wherein one of the two parameters defining the current point of control is validated as accurate before step (c) and the other of the two parameters is not validated and wherein at step (d) when the detection piece of information is emitted, the parameter that is not validated is identified as being erroneous.

5. The method according to claim 1, wherein the characteristic envelope is a flight envelope of the aircraft, and wherein the air parameter is a speed of the aircraft.

6. The method according to claim 1, wherein the characteristic envelope is an environmental envelope, and wherein the air parameter is a static temperature.

7. The method according to claim 6, wherein the air parameter corresponds to a total temperature, and wherein the environmental envelope defines a limitation list having minimum and maximum limit values of total temperature, to be used at step (c1).

8. An erroneous air data detection device configured to detect at least one erroneous air data on an aircraft during a flight, the device comprising:

an air parameter determination device that determines, automatically and repeatedly, a current air parameter of the aircraft;

an altitude pressure parameter determination device that determines, automatically and repeatedly, a current altitude pressure parameter of the aircraft;

a processing unit that determines whether one of the current air parameter and the current altitude pressure parameter is erroneous, based solely on operation of the following devices included in the processing unit:

a characteristic envelope compliance checking device that compares, automatically and repeatedly, (i) a current point of control defined by a pairing of the current air parameter and the current altitude pressure parameter, to (ii) a characteristic envelope defined by minimum and maximum air parameter limits and also minimum and maximum altitude pressure parameter limits, the characteristic envelope compliance checking device communicating with and distinct from the air parameter determination device and the altitude pressure parameter determination device; and an error identification and warning device that identifies at least one of the parameters defining the current point of control as an erroneous parameter based solely on whenever the current point of control is outside the characteristic envelope, as determined by the comparing performed by the characteristic envelope compliance checking device, the error identification and warning device then emitting a detection piece of information that identifies the erroneous parameter;

a parameter inhibiting device that invalidates the erroneous parameter to prevent the erroneous parameter from being used by a flight control system of the aircraft; and alarm devices that warn a crew of the aircraft about the erroneous parameter.

9. The erroneous air data detection device according to claim 8, further comprising:

a memory that communicates with the characteristic envelope compliance checking device and that determines from the characteristic envelope a limitation list defining, for each one of a plurality of values of a first parameter of the pairing of two parameters, minimum and maximum limit values for a second parameter of the pairing of two parameters.

10. An aircraft, comprising:

a flight control system configured to automatically guide the aircraft during flight; and an erroneous air data detection device, which comprises:

an air parameter determination device that determines, automatically and repeatedly, a current air parameter of the aircraft;

an altitude pressure parameter determination device that determines, automatically and repeatedly, a current altitude pressure parameter of the aircraft;

a processing unit that determines whether one of the current air parameter and the current altitude pressure parameter is erroneous, based solely on operation of the following devices included in the processing unit:

a characteristic envelope compliance checking device that compares, automatically and repeatedly, (i) a current point of control defined by a pairing of the current air parameter and the current altitude pressure parameter, to (ii) a characteristic envelope defined by minimum and maximum air parameter limits and also minimum and maximum altitude pressure parameter limits, the characteristic envelope compliance checking device communicating with and distinct from the air parameter determination device and the altitude pressure parameter determination device; and an error identification and warning device that identifies at least one of the parameters defining the current point of control as an erroneous parameter based solely on whenever the current point of control is outside the characteristic envelope, as determined by the comparing performed by the characteristic envelope compliance checking device, the error identification and warning device then emitting a detection piece of information that identifies the erroneous parameter;

a parameter inhibiting device that invalidates the erroneous parameter to prevent the erroneous parameter from being used by a flight control system of the aircraft; and alarm devices that warn a crew of the aircraft about the erroneous parameter.

\* \* \* \* \*